United States Patent [19]
Klink et al.

[11] Patent Number: 6,086,163
[45] Date of Patent: Jul. 11, 2000

[54] ELECTRONIC INTERFACE MANIFOLD ADAPTER FOR RAILROAD PASSENGER CARS

[75] Inventors: Douglas D. Klink, Weatherby Lake, Mo.; Robert D. Hrenchir, Spring Hill, Kans.

[73] Assignee: TSM, Inc., Kansas City, Mo.

[21] Appl. No.: 09/160,606

[22] Filed: Sep. 25, 1998

[51] Int. Cl.⁷ .................................................. B60T 13/00
[52] U.S. Cl. ................................... 303/7; 303/3; 303/15; 303/128
[58] Field of Search ................... 303/3, 7, 8, 9, 303/15, 28, 29, 33, 80, 128

[56] References Cited

U.S. PATENT DOCUMENTS

| | | |
|---|---|---|
| 4,509,801 | 4/1985 | Newton et al. . |
| 4,586,584 | 5/1986 | Auman et al. . |
| 5,249,125 | 9/1993 | Root et al. . |
| 5,335,974 | 8/1994 | Klink . |
| 5,572,187 | 11/1996 | Williford . |
| 5,701,974 | 12/1997 | Kanjo et al. . |
| 5,738,416 | 4/1998 | Kanjo et al. . |
| 5,813,730 | 9/1998 | Force ........................................ 303/15 |
| 5,924,774 | 7/1999 | Cook et al. ................................. 303/3 |
| 5,967,620 | 10/1999 | Truglio et al. .............................. 303/3 |
| 5,988,766 | 11/1999 | McCurdy, Jr. ............................. 303/28 |
| 6,024,419 | 2/2000 | Waldrop et al. ............................ 303/3 |

*Primary Examiner*—Chris Schwartz
*Attorney, Agent, or Firm*—Hovey, Williams, Timmons & Collins

[57] ABSTRACT

A manifold (24) is interposed between a pipe bracket (26) and a service valve (30) of a passenger rail car (20) braking system (22) also having a brake application relay valve (32), a primary control reservoir (48), a emergency control reservoir (54), and a main reservoir (44). The manifold includes electronically controlled emergency fill (78), normal fill (80), vent (82), and bypass (84) valves and pneumatically controlled secondary emergency fill (136), secondary normal fill (138), secondary vent (140) and manifold relay (142) valves. Electrical signals are received by the electronically controlled valves (78, 80, 84) which then operate the pneumatically controlled valves (136, 138, 142) to transmit pressure from the control reservoirs (48,54) to a brake application relay valve (32). The brake application relay valve then operates to transmit pressure from a main reservoir (44) to a braking device (36) which brakes the passenger rail car (20). When the braking device (36) is to cease braking, the vent valves (82, 140) operate to vent pressure from the brake application relay valve (32) which then ceases the transmission of pressure from the main reservoir (44) to the braking device (36). Speed control orifices (174, 176) and a volume adding chamber (160) are used to fine tune the braking system (22).

20 Claims, 4 Drawing Sheets

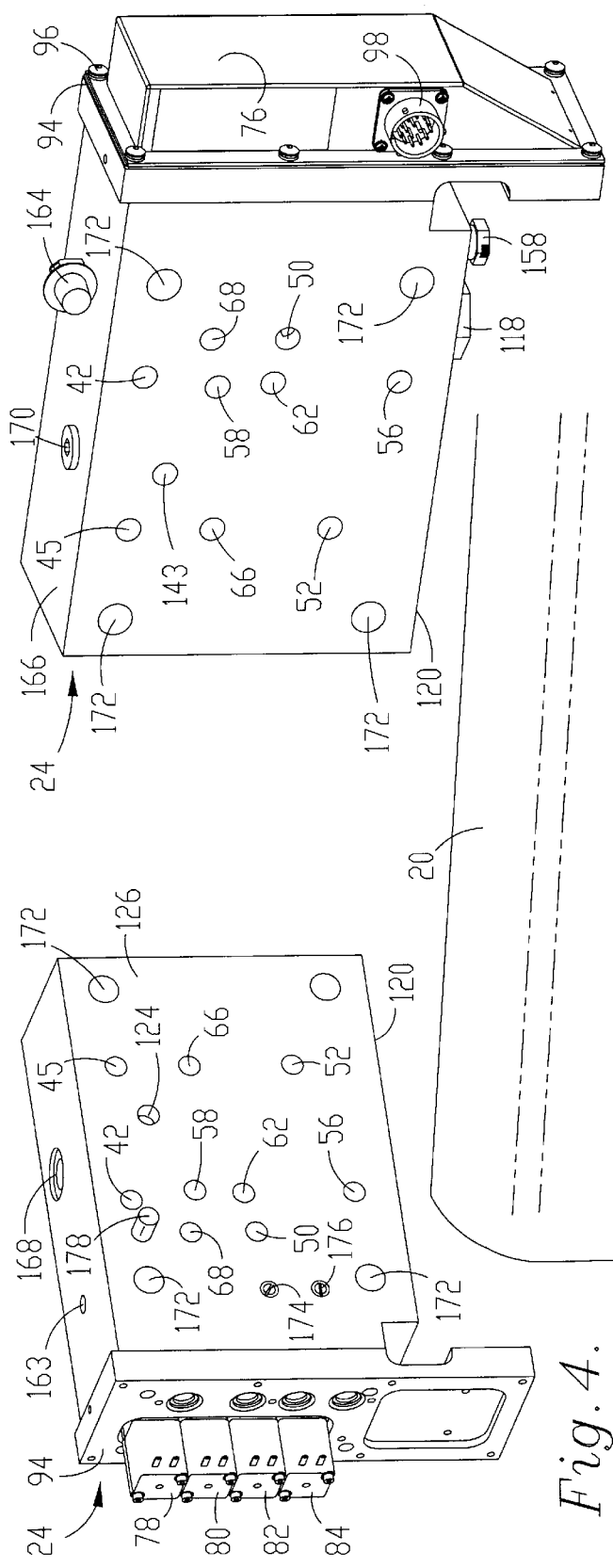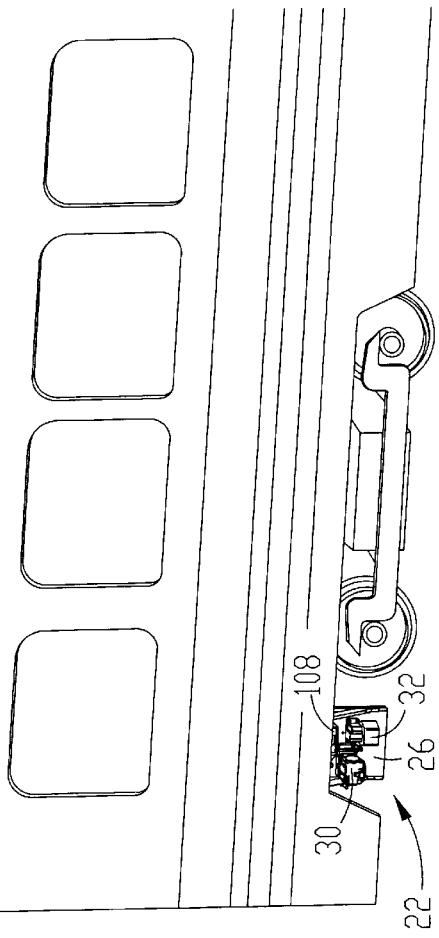

ELECTRONIC INTERFACE MANIFOLD ADAPTER FOR RAILROAD PASSENGER CARS

BACKGROUND OF THE INVENTION

1. Field of the Invention

This invention relates to railroad braking systems and, more particularly, to air distribution manifolds configured to retrofit existing passenger rail car pneumatic braking systems for electronic braking control.

2. Description of Prior Art

Brake systems for railroad passenger cars are commonly operated and controlled by air. Such pneumatic brake systems typically include operator controls, a control airline, dual chamber air tanks having primary control reservoirs and emergency control reservoirs, AB valves with pipe brackets and service/emergency portions, and brake application devices. The control airline extends over the entire length of the train and operatively connects with the AB valves of the individual passenger rail cars, and each AB valve operatively connects with the brake applications system of the corresponding car.

When the engineer operates the controls to brake the train under ordinary conditions, air pressure in the control airline decreases which in turn causes air from the primary control reservoirs of each car to enter the AB valves and activate the braking systems of each car. The operator controls determine the pressure drop in the control airline, and the pressure drop in the control airline determines the braking pressure applied by the braking device. The greater the pressure drop in the control airline, the more braking pressure applied by the braking devices.

In the event of a sudden, substantial pressure drop (in excess of 20 psi) in the control airline, air from the emergency reservoirs and the primary reservoirs of each car enter the AB valves causing the braking devices to apply full braking pressure. This condition can occur, for example, when a car is disconnected from the remainder of the train venting the pressure in the control airline.

While these braking systems effectively brake trains, several undesirable things occur during operation of these braking systems. For example, when the engineer operates the controls to brake the train, the pressure drop in the control airline propagates from the front to the rear of the train at the speed of sound. Therefore, each railroad car begins to brake just after the car in front of it. This creates a "run-in" condition during which cars run into the cars immediately in front of them. Another problem is that the same braking force is applied to all of the cars irrespective of their individual weights. Thus, an empty car will slow more quickly than a full car thereby increasing the occurrences and severity of run-in conditions. In extreme cases, the wheels of the car can lock, potentially leading to derailment. Run-in conditions are also intensified in longer trains.

To solve the problems encountered in these braking systems, electronically controlled barking systems have been proposed in which wired electronic or wireless signals from the engine are transmitted to respective receivers in the cars. Because the signal is transmitted at the speed of light in these systems, the run-in problem is substantially eliminated. Further, onboard, individualized, electronic control can be provided for each car in connection with electronically controlled braking systems. Thus, anti-skid systems, such as the anti-skid system disclosed by U.S. Pat. No. 5,735,580 to Klink, which is hereby fully incorporated herein by reference, are utilized to appropriately vary the braking force applied to individual cars based on the weight of the individual cars.

Unfortunately, prior art electronic braking systems do not operate with conventional passenger rail car pneumatic braking systems and are not capable of adapting conventional passenger rail car pneumatic braking systems to electronic control. As a result, every passenger car of a train must be electronically equipped, making conversion economically impractical. U.S. Pat. Nos. 5,335,974 and 5,813,730 to Klink, which are hereby fully incorporated herein by reference, provide an apparatus for retrofitting freight cars with electronic braking controls. However, these devices fail to address the complexity of and redundance designed into passenger railcars.

SUMMARY OF THE INVENTION

The present invention solves the problems mentioned above and provides a distinct advance in the state of the art. In particular, the invention allows an existing pneumatic brake system to be retrofitted for electronic control. A manifold having a plurality of passageways is interposed between two components of an existing pneumatic brake system. The two components include passageways which are connected by the manifold passageways. The manifold includes electronically controlled valves which operate the brake system and select either electronic or pneumatic control of the brake system.

In a preferred embodiment, the manifold includes three electronically controlled primary valves which operate three pneumatically controlled secondary valves. A secondary fill valve is interposed between a manifold control reservoir passageway and a manifold relay passageway to selectively interrupt and permit a flow of pressurized air from a control reservoir through the manifold control reservoir passageway into the manifold relay passageway. A primary fill valve is electronically controlled to operate the secondary fill valve. A manifold relay valve separates a pipe bracket side from a service valve side of the manifold relay passageway and selectively connects either an electronic control portion or a pneumatic control portion of the service valve side to the pipe bracket side. A bypass valve is electronically controlled to operate the manifold relay valve. A secondary vent valve is positioned in pneumatic communication with the manifold relay passageway to vent the manifold relay passageway after braking is completed. A primary vent valve is electronically controlled to operate the secondary vent valve.

The primary valves and the bypass valve are preferably solenoid valves, and the secondary valves and the manifold relay valve are preferably pneumatically controlled. Primary and secondary emergency fill valves are also provided for emergency braking. A volume adding cylinder of approximately 17 cubic inches is pneumatically connected to the manifold relay passageway and is vented, along with the manifold relay passageway, by the vent valves. The manifold also includes a plurality of pressure transducers to provide pressure data for control functions, and a pair of speed control orifices control the flow rate of air from the primary and emergency control reservoirs into the relay passageways.

BRIEF DESCRIPTION OF THE DRAWINGS

FIG. 1 is a fragmentary perspective view of a passenger rail car having a pneumatic braking system retrofitted with a electronic interface manifold for electronic control of the pneumatic braking system;

FIG. 4 is a perspective, pipe bracket side view of the electronic interface manifold of FIG. 2;

FIG. 5 is a perspective, service valve side view of the electronic interface manifold of FIG. 2.

DETAILED DESCRIPTION OF THE PREFERRED EMBODIMENTS

Figure 2:
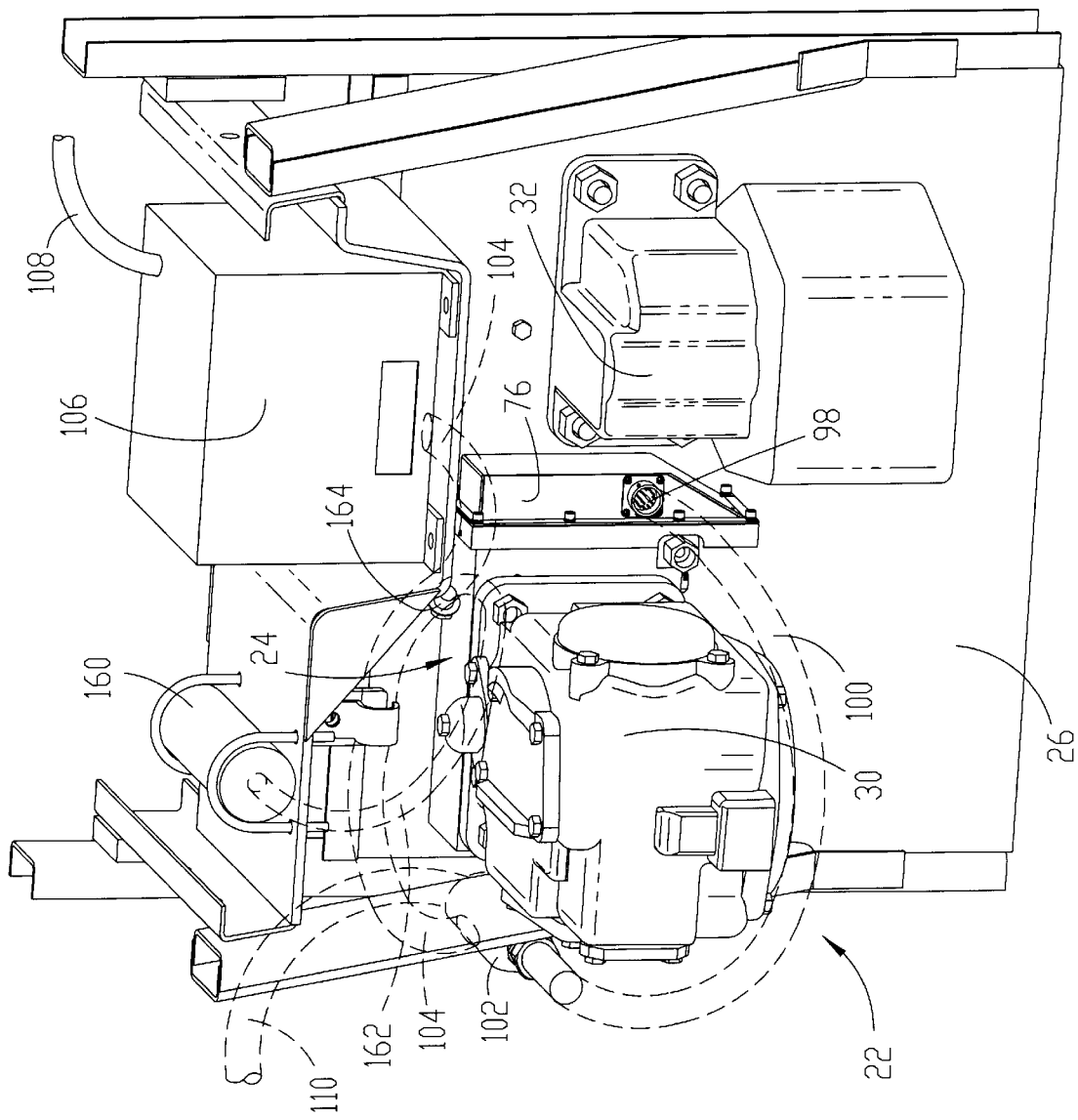
FIG. 2 is a perspective view of the pneumatic braking system and electronic interface manifold of FIG. 1.

FIGS. 1 and 2 illustrate a passenger rail car 20 having a pneumatic braking system 22 retrofitted with a preferred electronic interface manifold adapter 24 in accordance with the present invention. The braking system 22 includes a pipe bracket 26, a pressurized break pipe 28 (FIG. 3), a service valve 30, and a brake application relay valve 32. The manifold 24 is interposed between the pipe bracket 28 and the service valve 30. The braking system 22 includes components which are known in the art, and thus, will be included and described to the extent necessary to describe the invention and its operation. Further, each passenger rail car has its own braking system which combines with the braking systems of the other rail cars to brake a train. However, the invention will generally be described with reference the braking system of one passenger rail car.

Figure 3:
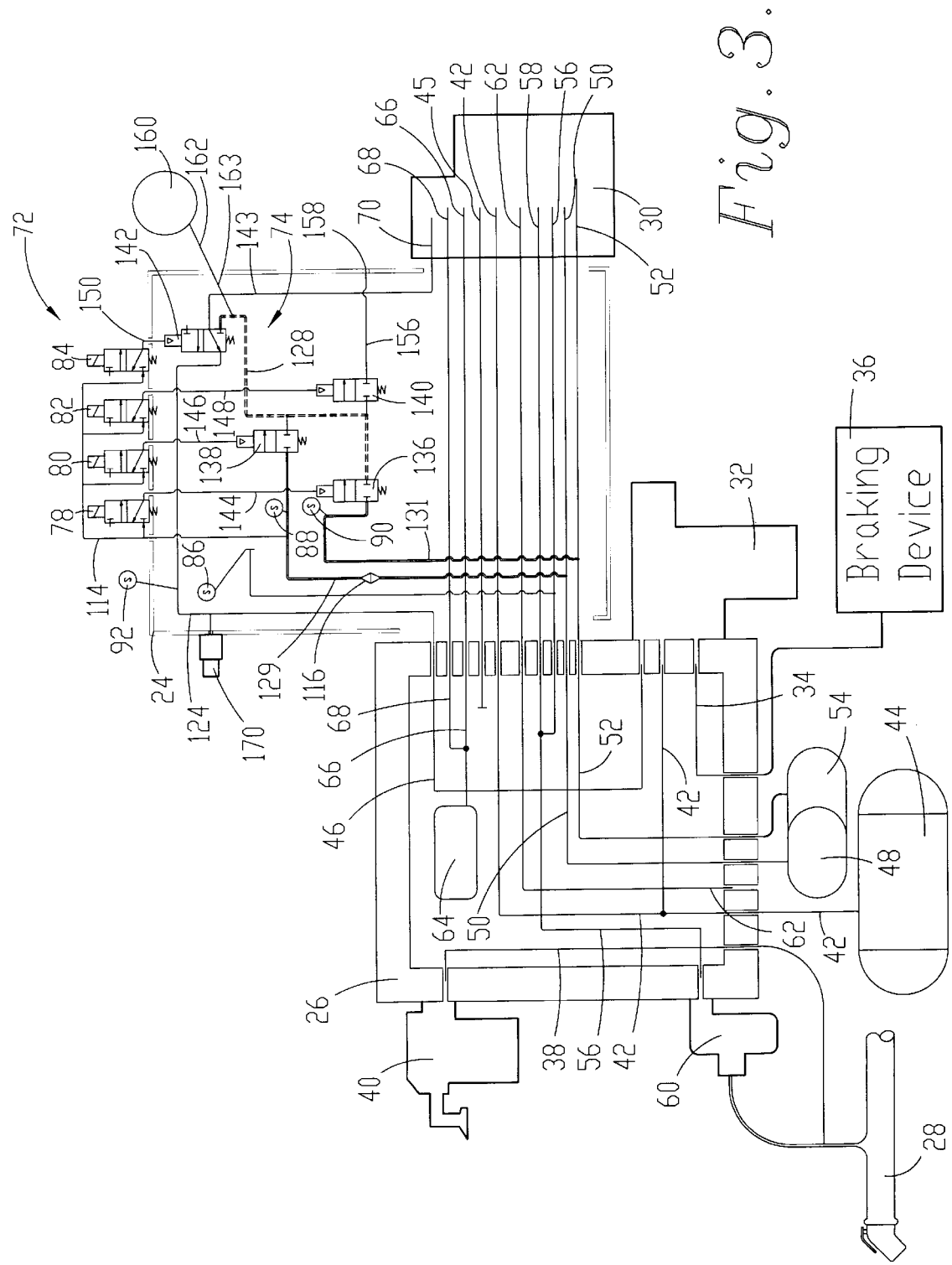
FIG. 3 is a schematic line diagram of the pneumatic braking system and electronic interface manifold of FIG. 2 having portions thereof omitted for clarity.

Referring to FIG. 3, the pipe bracket 26 includes a plurality of pipe bracket passageways which extend through the pipe bracket. Many of the passageways continue into other components of the braking system, so for convenience and clarity, common passageways extending through multiple components will generally be identified with identical reference numerals. A brake line 34 pneumatically connects a braking device 36 with the brake application relay valve 32, and an emergency vent passageway 38 pneumatically connects the brake pipe 28 with an emergency vent valve 40. A main reservoir passageway 42 pneumatically connects a main reservoir 44 with both the relay valve 32 and the manifold 24. A second main reservoir passageway 45 is also provided. The main reservoir 44 is supplied with air from a main reservoir pipe (not shown) which runs substantially the entire length of the train and is pressurized to approximately 130 psi.

A relay passageway 46 extends between the relay valve 32 and the manifold 24. A primary control reservoir 48 is pneumatically connected to the manifold 24 by a primary reservoir passageway 50, and an emergency control reservoir passageway 52 is in pneumatic communication with an emergency reservoir 54. The emergency reservoir passageway 52 pneumatically connects the emergency reservoir 54 with the manifold 24. A brake pipe passageway 56 extends between the brake pipe 28 and the manifold 24 and branches of into a brake pipe test line 58 which also extends to the manifold. A dirt collector 60 is positioned in the brake pipe passageway 56 between the pipe bracket 26 and the brake pipe 28. The pipe bracket also includes an exhaust passageway 62 and a quick service volume 64 with two quick service passageways 66, 68 in pneumatic communication with the quick service volume 64.

The brake pipe 28 is pressurized and extends from car to car over substantially the entire length of the train. The brake pipe 28 connects to the pipe bracket 26 through both the emergency vent passageway 38 and the brake pipe passageway 56. The brake pipe is preferably pressurized at approximately 90 psi or approximately 110 psi.

The service valve 30 includes the main reservoir passageways 42, 45, the primary reservoir passageway 50, the emergency reservoir passageway 52, the break pipe passageway 56, the break pipe test line 58, the exhaust passageway 62, and the quick service passageways 66, 68. The service valve also includes a service valve relay passageway 70 which extends to the manifold 24. The service valve shown is a 26C service/emergency valve, but other valves could be substituted therefor depending on the application.

The brake application relay valve 32 includes the relay passageway 46, main reservoir passageway 42, and the brake line 34. The relay valve shown is a J-type relay valve, but other valves, such as an RLV-11-D, could be substituted therefor depending on the application.

Figure 6:
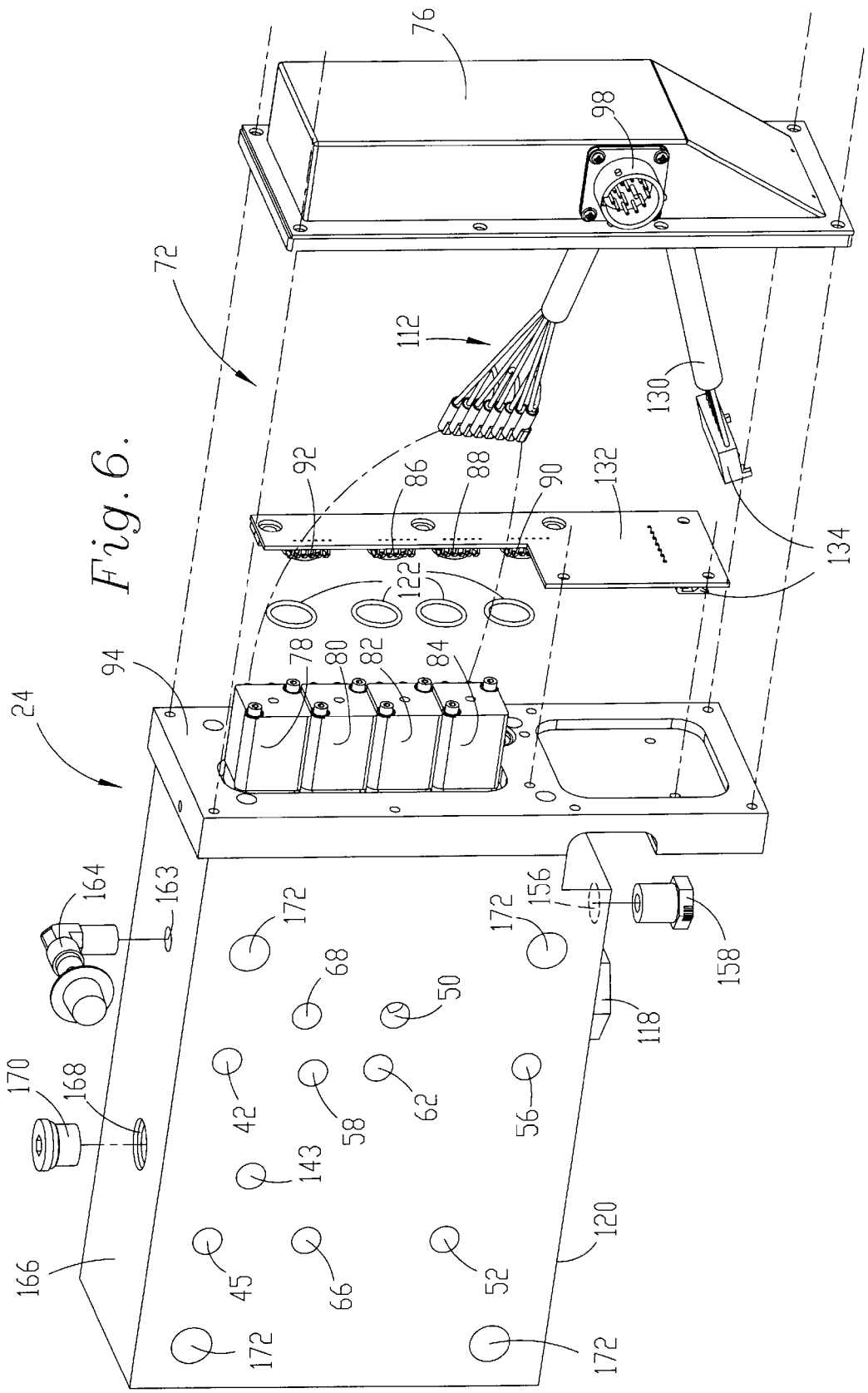
FIG. 6 is an exploded perspective, service valve side view of the electronic interface manifold of FIG. 2.

Referring to FIGS. 3 and 6, the manifold 24, like the service valve and pipe bracket, includes the main reservoir passageways 42, 45, the primary control reservoir passageway 50, the emergency control reservoir passageway 52, the break pipe passageway 56, the break pipe test line 58, the exhaust passageway 62, and the quick service passageways 66, 68. These passageways extend between and pneumatically connect the corresponding passageways of the pipe bracket 26 and the service valve 30. The manifold 24 also includes an electronic control assembly 72 and a pneumatic control assembly 74.

Referring additionally to FIGS. 2 and 5, the electronic control assembly 72 includes a housing 76, a plurality of primary, electronically controlled valves 78, 80, 82, 84, and a plurality of pressure transducers 86, 88, 90, 92. The housing 76 attaches to a control face 94 of the manifold 24 with fasteners 96 and includes a manifold cable connector 98. A manifold cable 100 plugs into the cable connector 98 and extends to a T-joint 102. A CCU cable 104 extends from the T-joint to a CCU 106 which is in communication with control wiring 108 extending between the passenger rail cars. A brake cable 110 also extends from the T-joint 102 to the braking device.

The primary, electronically controlled valves comprise an emergency fill valve 78, a normal braking fill valve 80, a vent valve 82, and a bypass valve 84. The primary valves are preferably solenoid valves mounted on the control face 94 of the manifold 24. Valve control wires 112 extend from the manifold cable connector 98 and connect to the primary valves. Each valve uses approximately 0.5 Watts for operation. An air feed line 114 is in pneumatic communication with one of the control reservoirs 48, 54, preferably the primary control reservoir 48, and each of the primary valves. A filter 116 is placed in the primary control reservoir passageway 50 to prevent air passages in the primary valves from being clogged. The filter 116 is sealed in the manifold by a filter plug 118 on the bottom 120 of the manifold 24.

The pressure transducers comprise a brake pipe pressure sensor 86, a primary control reservoir pressure sensor 88, an emergency control reservoir pressure sensor 90, and a manifold relay passageway pressure sensor 92. The pressure transducers are sealed with O-rings 122 in pneumatic communication with the corresponding passageways. The manifold relay passageway pressure sensor 92 is in pneumatic communication with a pipe bracket side manifold relay passageway 124 seen on a pipe bracket side 126 (FIG. 4) of the manifold and pneumatically communicating with the pipe bracket relay passageway 46. Pressure sensor control wires 130 extend from the manifold cable connector 98 and connect to a PCB 132 with an electronic connector 134. The PCB operatively mounts the pressure sensors 86–92, and the PCB 132 is mounted on the control face 94 with fasteners (not shown).

The manifold relay passageway also has a service valve side with an electronic control portion 128. The manifold also defines an electronic control primary reservoir passageway 129 and an electronic control emergency reservoir passageway 131 extending from the primary control reservoir passageway 50 and the emergency control reservoir passageway 52, respectively.

The pneumatic control assembly 74 includes a plurality of secondary, pneumatically controlled valves 136, 138, 140, 142 and a pneumatic control portion 143 of the service valve side of the manifold relay passageway. The pneumatic control portion 143 is in communication with the service valve relay passageway 70.

The secondary valves comprise an emergency fill valve 136, a normal braking fill valve 138, a vent valve 140, and a manifold relay valve 142. The secondary emergency fill valve 136 is in pneumatic communication with an emergency valve control line 144 coming from the primary emergency fill valve 78. The secondary normal fill valve 138 is in pneumatic communication with a normal fill valve control line 146 coming form the primary normal fill valve 80. The secondary vent valve 140 communicates with a vent valve control line 148 extending from the primary vent valve 82, and the manifold relay valve 142 is in pneumatic communication with a bypass control line 150 from the bypass valve 84. The electronic control primary reservoir passageway 129 extends from the primary reservoir passageway 50 to the secondary, normal braking fill valve 138, and the electronic control emergency reservoir passageway 131 extends from the emergency reservoir passageway 52 and terminates at the secondary, emergency fill valve 136.

The pipe bracket side 124 of the manifold relay passageway terminates at the manifold relay valve 142, and the pneumatic control portion 143 of the service valve side of the manifold relay passageway terminates on the opposite side of the pneumatically controlled manifold relay valve 142. The electronic control portion 128 of the service valve side of the manifold relay passageway also terminates at the manifold relay valve 142 on the same side as the pneumatic control portion 143. The electronic control portion 128 is also in pneumatic communication with the secondary, normal and emergency fill valves 138, 136 opposite the electronic control primary and emergency reservoir passageways 129, 131. Further, the electronic control portion 128 is in pneumatic communication with the secondary vent valve 140, and a vent line 156 extends from the vent valve to a vent 158 in the bottom 120 of the manifold 24. The vent is preferably open to atmosphere.

A volume adding chamber 160 is mounted on the pipe bracket 26 and is in pneumatic communication with the electronic control portion 128 of the valve side of the manifold relay passageway. The chamber has a volume of approximately seventeen (17) cubic inches which is optimal for the braking system shown. Other sizes would be optimal for other braking systems. A chamber hose 162 is connected to a hose connector 164 which connects to a chamber line 163 at a top 166 of the manifold 24. The chamber line 163 extends to the electronic control portion 128 of the manifold relay passageway.

A test port 168, for testing the operation of the manifold 24, opens on the top 166 of the manifold and connects to the pipe bracket side manifold relay passageway 124. A plug 170 covers the test port 168 during normal operation. A plurality of bolt holes 172 extend through the corners of the manifold to attach the manifold between the pipe bracket and the service valve. A threaded primary reservoir passageway, speed control orifice 174 is positioned on the pipe bracket side 126 of the manifold, and an emergency reservoir passageway, speed control orifice 176 is also positioned on the pipe bracket side of the manifold 24. Alternatively, needle valves could be used in place of the orifices 174, 176. An alignment pin 178 extends from the pipe bracket side 126 of the manifold 24 to align the manifold with the pipe bracket 26. The alignment pint 178 also prevents the manifold 24 from being installed in an incompatible braking system.

Referring to FIGS. 2 and 3, during electronic operation, the bypass valve 84 is energized causing air pressure from the primary control reservoir 48 to pass through the primary control reservoir passageway 50 and into the electronic control primary reservoir passageway 129. As air passes through the electronic control passageway 129, it also passes through filter 116 which filters the air to prevent the primary valves 78, 80, 82, 84 from clogging with debris. The air flows through the air feed line 114 to the bypass valve and from the by pass valve through the bypass control line 150 to the manifold relay valve 142. With pressure applied, the manifold relay valve 142 pneumatically connects the electronic control portion 128 of the service valve side of the manifold relay passageway to the pipe bracket side manifold relay passageway 124.

During pneumatic operation, the bypass valve 84 is de-energized cutting off the air supply to the manifold relay valve 142. With no air pressure, the spring of the manifold relay valve 142 places the pipe bracket side manifold relay passageway 124 into pneumatic communication with the pneumatic control portion 143 of the service valve side of the manifold relay passageway thereby connecting the service valve relay passageway 70 with the pipe bracket side relay passageway 124. In this condition, the manifold 24 becomes essentially invisible to the braking system 22, and the braking system operates as if the manifold were not there. Thus, the bypass valve 84 and manifold relay valve 142 are operative to connect a selected one of the pneumatic control portion 143 and the electronic control portion 128 with the pipe bracket side manifold relay passageway 124.

Pneumatic control is used primarily in emergency breaking situations. For example, if the brake pipe 28 ruptures, the emergency vent valve 40 detects a sudden drop in pressure and immediately vents additional pressure from the brake pipe 28 through emergency vent passageway 38. The brake pipe pressure sensor 86 also detects the pressure drop, and the bypass valve 84 is de-energized, so that the service valve 30 responds to the drop in pressure to brake the train. The manifold 24 is biased toward pneumatic control in that when all the primary valves are de-energized, as would occur with a loss of electrical power, the braking system 22 is returned to pneumatic control. Specifically, when the primary emergency fill, fill, and vent valves 78, 80, 82 are de-energized, the secondary emergency fill, fill, and vent valves 136, 138, 140 are closed. When the bypass valve 84 is de-energized, the manifold relay valve 142 connects the pneumatic control portion 143, and hence the service valve 30, with the pipe bracket relay passageway 46.

In normal operation, however, the bypass valve 84 is energized for electronic operation of the braking system 22. When the train engineer operates the braking system controls to brake the train, the signal is transmitted by the control wiring 108 to the CCU 106 of each passenger rail car 20. The CCU 106 actuates the primary, normal braking fill valve 80 passing air from the air feed line 114 to the normal fill valve control line 146 which opens the secondary, normal fill valve 138 which is operative to selectively interrupt and permit the flow of pressurized air. With the secondary fill valve 138 open, air pressure from the primary control reservoir 48 flows from the electronic control, primary reservoir passageway 129 into the electronic control portion 128 of the manifold relay passageway. The air pressure then passes through the manifold relay valve 142, into the pipe bracket side manifold relay passageway 124, through the pipe bracket relay passageway 46, and into the brake application relay valve 32. The manifold relay passageway pressure sensor 92 monitors the pressure in the relay passageways, and when the pressure is sufficiently high for the amount of braking indicated by the train engineer, the primary fill valve 80 is de-energized to close the secondary fill valve 138. When the pressure reaches the brake application relay valve 32, it connects the main reservoir passageway 42 with the brake line passageway 34, so that pressure from the main reservoir 44 passes to the braking device 36 thereby braking the passenger rail car 20.

As the pressurized air fills the electronic control portion 128 of the manifold relay passageway, it also fills the volume adding chamber 160. The chamber 160 operates to slow the pressure increase in the relay passageways giving the sensor 92, CCU 106, and valves 80, 138 time to respond to the pressure rise and close the secondary fill valve 138 at the correct moment. Without the chamber 160, the pressure can increase to quickly for the valves to respond causing the system to repeatedly vent and fill during braking.

When the braking is complete, the primary vent valve 82 is then energized transmitting air from the air feed line 114 to the vent valve control line 148 opening the secondary vent valve 140. The open secondary vent valve 140 vents the volume adding chamber 160 and the relay passageways 46,124,128 through vent line 156 and vent 158 to atmosphere. With the relay passageways vented, the brake application relay valve 32 severs the pneumatic connection between the main reservoir 44 and the braking device 36 to cease braking the train.

If a large braking force is required, the primary emergency fill valve 78 is also energized. Once energized, the emergency fill valve 78 transmits pressure from the air feed line 114 to the emergency fill valve control line 144 opening the secondary emergency fill valve 136. When open, the secondary fill valve 136 transmits pressure from the emergency control reservoir 54 through the emergency control reservoir passageways into the electronic control portion 128 of the manifold relay passageway. The increased pressure in the relay passageways causes the brake application relay valve 32 to transmit increased pressure from the main reservoir 44 to the braking device 36.

The brake pipe sensor 86, primary control reservoir passageway sensor 88, and emergency control reservoir passageway sensor 90 monitor the air pressure in the brake pipe 28, primary control reservoir 48, and emergency control reservoir 54. If a substantial and sudden drop in pressure is detected, caused perhaps by a rupture, the bypass valve is de-energized returning the system to pneumatic control, so that the service valve 30 can enact an emergency brake of the train.

The primary reservoir passageway, speed control orifice 174 controls the speed at which air flows through the electronic control primary reservoir passageway 129, and the emergency reservoir passageway, speed control orifice 176 controls the speed at which air flows through the electronic control emergency reservoir passageway 131. By controlling the speed of the air, the orifices control the rate of fill in the relay passageways and hence control the braking of the train. To increase the fill rate, the orifices are threaded out of the manifold and replaced by larger orifices. To decrease the fill rate the orifices are removed and replaced by smaller orifices. The larger the orifice the faster that braking will occur, and the smaller the orifice the slower that braking will occur.

The operation of the quick service volume 64 and quick service passageways 66, 68, as well as other features, is known in the art and will not be described herein. However, the manifold 24 has been specially designed to incorporate features, such as the quick service passageways 66, 68 and main reservoir passageways 42, 45, allowing these known features to continue their normal operation even under electronic control of the braking system 22.

Because the braking signal from the engineer is transmitted electronically, at the speed of light, the "run-in" problem is substantially eliminated making passenger trains safer and more pleasant to ride. The addition of other features, such as the orifices 174, 176 and the volume adding chamber 160, allow the braking system to be fine tuned for enhancement of the braking system 22. Thus, the manifold 24 according to the present invention address the complexity of passenger train braking systems and allows for cost effective retrofitting of passenger train pneumatic braking systems to electronic control.

Those skilled in the art will appreciate that the present invention encompasses many variations in the preferred embodiment described herein.

Having thus described that embodiment, the following is claimed as new and desired to be secured by Letters Patent:

1. An air manifold allowing at least partial electronic control of a passenger train pneumatic braking system including: a brake application relay valve, a service valve, a pipe bracket, a control reservoir of pressurized air, a brake pipe, and a braking device; the service valve and pipe bracket each comprising:

a control reservoir passageway in pneumatic communication with the control reservoir;

a brake pipe passageway in pneumatic communication with the brake pipe; and a relay passageway in pneumatic communication with the brake application relay valve;

the manifold being interposed between the service valve and the pipe bracket, the manifold comprising:

a manifold control reservoir passageway pneumatically connecting the control reservoir passageways of the service valve and pipe bracket;

a manifold brake pipe passageway pneumatically connecting the brake pipe passageways of the service valve and pipe bracket;

a manifold relay passageway for selectively and pneumatically connecting the relay valve passageways of the service valve and pipe bracket;

an electronically controlled fill valve operative to selectively interrupt and permit a flow of pressurized air from the control reservoir through the manifold control reservoir passageway to the manifold relay passageway;

an electronically controlled vent valve operative to vent pressurized air from the manifold relay passageway; and an electronically controlled bypass valve operative to select between electronic and pneumatic control of the pneumatic braking system.

2. The manifold according to claim 1 wherein the manifold control reservoir passageway comprise on electronic control portion and the manifold relay passageway comprises a pneumatic control portion and an electronic control portion.

3. The manifold according to claim 2 further comprising a pneumatically controlled manifold relay valve, and wherein the electronic control portion of the manifold relay passageway and the pneumatic control portion of the manifold relay passageway terminate at the pneumatically controlled manifold relay valve, the pneumatically controlled manifold relay valve being operable to selectively connect one of the electronic control portion and the pneumatic control portion to a pipe bracket side of the manifold relay passageway, and the pneumatic controlled relay valve being operated by the electronically controlled by pass valve.

4. The manifold according to claim 1 further comprising a pneumatically controlled fill valve interposed between the manifold control reservoir passageway and the manifold relay passageway, and wherein the pneumatic controlled fill valve is operated by the electronically controlled bill valve.

5. The manifold according to claim 4 wherein the electronically controlled fill valve is in operative pneumatic communication with the manifold reservoir passageway and utilizes pressure from the manifold reservoir passageway to operate the pneumatically controlled fill valve.

6. The manifold according to claim 1 further comprising a pneumatically controlled vent valve, and wherein the pneumatically controlled vent valve is operated by the electronically controlled vent valve.

7. The manifold according to claim 6 wherein the electronically controlled vent valve is in operative pneumatic communication with the manifold reservoir passageway and utilizes pressure from the manifold reservoir passageway to operate the pneumatically controlled vent valve.

8. The manifold according to claim 1 further comprising a speed control orifice in the manifold control reservoir passageway and controlling the flow of air through the manifold control reservoir passageway.

9. The manifold according to claim 1 further comprising an electronically controlled emergency fill valve, and a pneumatically controlled emergency fill valve being operated by the electronically controlled emergency fill valve; wherein the brake system further includes an emergency control reservoir, the pipe bracket and service valve further include an emergency reservoir passageway, and the manifold further includes an emergency reservoir passageway; and the pneumatically controlled emergency fill valve is operative to selectively interrupt and permit a flow of pressurized air from the emergency reservoir through the manifold emergency reservoir passageway to the manifold relay valve passageway.

10. An air manifold allowing at least partial electronic control of a passenger train air brake system including: a brake application relay valve, a service valve, a pipe bracket, a primary control reservoir of pressurized air, a brake pipe, and a braking device; the service valve and pipe bracket each comprising:
   a reservoir passageway in pneumatic communication with the primary control reservoir;
   a brake pipe passageway in pneumatic communication with the brake pipe; and
   a relay passageway in pneumatic communication with the brake application relay valve;

the manifold comprising:
   a manifold reservoir passageway pneumatically connecting the reservoir passageways of the service valve and pipe bracket;
   a manifold brake pipe passageway pneumatically connecting the brake pipe passageways of the service valve and pipe bracket;
   a manifold relay passageway selectively and pneumatically connecting the relay valve passageways of the service valve and pipe bracket, and the manifold relay passageway having a pipe bracket side and a service valve side with a electronic control portion and a pneumatic control portion;
   an electronically controlled primary fill valve;
   an electronically controlled primary vent valve;
   an electronically controlled bypass valve;
   a secondary fill valve interposed between the manifold reservoir passageway and the manifold relay passageway and being operative to selectively interrupt and permit a flow of pressurized air from the reservoir through the manifold reservoir passageway to the manifold relay passageway;
   a secondary vent valve in pneumatic communication with the manifold relay passageway to vent the manifold relay passageway after braking is completed;
   a manifold relay valve interposed between the pipe bracket side and the service valve side of the manifold relay passageway, and the manifold relay valve being operative to selectively and pneumatically connect a selected one of the electronic control portion and the pneumatic control portion with the pipe bracket side of the manifold relay passageway;
   the electronically controlled primary fill valve being operative to open and close the secondary fill valve;
   the electronically controlled primary vent valve being operative to open and close the secondary vent valve; and
   the electronically controlled bypass valve being operative to open and close the manifold relay valve whereby a selection is made between electronic and pneumatic control of the pneumatic braking system.

11. The manifold according to claim 10 wherein the secondary fill valve, secondary vent valve, and manifold relay valve are pneumatically controlled.

12. The manifold according to claim 10 wherein the primary fill valve comprises a solenoid valve having a de-energized position which operates to close the secondary fill valve and pneumatically separate the manifold reservoir passageway from the manifold relay passageway, and the primary vent valve comprises a solenoid valve having a de-energized position which operates to close the secondary vent valve and pneumatically separate the manifold relay passageway from atmosphere.

13. The manifold according to claim 10 further comprising a brake pipe pressure transducer, a reservoir pressure transducer, and a relay pressure transducer to sense the pressures in the brake pipe, reservoir, and relay passageway respectively.

14. The manifold according to claim 10 wherein the bypass valve comprises a solenoid valve having a de-energized position which operates the manifold relay valve to pneumatically connect the pneumatic control portion of the manifold relay passageway to the pipe bracket side of the manifold relay passageway.

15. A passenger train pneumatic braking system retrofitted with an electronic braking control system to provide a combined pneumatically and electronically controlled braking system comprising:

a control unit;

a primary reservoir of pressurized air;

a main reservoir of pressurized air;

a braking device operative to brake a passenger rail car;

a brake pipe containing pressurized air;

a brake application relay valve having a main reservoir passageway in pneumatic communication with the main reservoir and a brake line passageway in pneumatic communication with the braking device;

a pipe bracket having a primary reservoir passageway in pneumatic communication with the primary reservoir, a main reservoir passageway in pneumatic communication with the main reservoir and the brake application relay valve main reservoir passageway, a brake line passageway in pneumatic communication with the braking device and the brake application relay brake line passageway, a brake pipe passageway in pneumatic communication with the brake pipe, and a relay passageway in pneumatic communication with the brake application relay valve;

a service valve having a primary reservoir passageway, a brake pipe passageway, and a relay passageway;

a manifold interposed between the service valve and the pipe bracket and having a primary reservoir passageway pneumatically connecting the pipe bracket and service valve primary reservoir passageways, a brake pipe passageway pneumatically connecting the pipe bracket and service valve brake pipe passageways, and a relay passageway extending between the pipe bracket and service valve relay passageways;

an electronically controlled bypass valve controlled be the control unit and being operative to select between electronic and pneumatic operation of the brake system; and an electronically controlled fill valve controlled by the control unit and being operative to selectively interrupt and permit a flow of pressurized air from the primary reservoir through the primary reservoir passageways into the manifold and pipe bracket relay passageways, so that pressurized air from the primary reservoir is transmitted to the brake application relay valve whereby the brake application relay valve pneumatically connects the main reservoir passageway with the brake line passageway to transmit pressurized air from the main reservoir to the braking device and brake the passenger rail car.

16. The braking system according to claim 15 further comprising a manifold relay valve controlled by the bypass valve; wherein the manifold relay passageway includes a service valve side having an electronic control portion and a pneumatic control portion, and a pipe bracket side in pneumatic communication with the pipe bracket; and the manifold relay valve being operative to selectively and pneumatically connect the pipe bracket side of the manifold relay passageway with a selected one of the electronic control portion and the pneumatic control portion.

17. The braking system according to claim 16 further comprising a volume adding chamber in pneumatic communication with the electronic control portion of the manifold relay passageway.

18. The braking system according to claim 17 wherein the volume adding chamber comprises a volume of approximately seventeen cubic inches.

19. The braking system according to claim 17 wherein the volume adding chamber is in pneumatic communication with a vent valve whereby the chamber and the manifold relay passageway is vented by the vent valve.

20. The braking system according to claim 15 further comprising a plurality of control units and control wiring extending between passenger rail cars for transmitting control signals to the control unit of each passenger rail car.

* * * * *